(12) United States Patent
Ehinger et al.

(10) Patent No.: US 8,863,924 B2
(45) Date of Patent: Oct. 21, 2014

(54) HYBRID OVERRUNNING CLUTCH ASSEMBLY AND METHOD OF MAKING SAME

(75) Inventors: Ryan T. Ehinger, Southlake, TX (US); Eric S. Olson, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 195 days.

(21) Appl. No.: 13/615,711

(22) Filed: Sep. 14, 2012

(65) Prior Publication Data

US 2013/0098732 A1   Apr. 25, 2013

Related U.S. Application Data

(60) Provisional application No. 61/550,561, filed on Oct. 24, 2011.

(51) Int. Cl.
*F16D 41/06* (2006.01)
*F16D 1/08* (2006.01)

(52) U.S. Cl.
CPC .............. *F16D 41/06* (2013.01); *F16D 1/0858* (2013.01)
USPC ...................... 192/41 R; 192/45.1; 192/107 T

(58) Field of Classification Search
None
See application file for complete search history.

(56) References Cited

U.S. PATENT DOCUMENTS

| | | | |
|---|---|---|---|
| 4,660,698 A | 4/1987 | Miura | |
| 4,735,299 A | 4/1988 | Ohuchi | |
| 5,094,076 A | 3/1992 | Henricks | |
| 5,485,905 A | 1/1996 | Rader, III | |
| 6,446,777 B1 * | 9/2002 | Nakagawa et al. | 192/45.1 |
| 7,261,715 B2 * | 8/2007 | Rezach et al. | 606/60 |

FOREIGN PATENT DOCUMENTS

DE   102007036001 A1   2/2009
JP   59069536 A   4/1984

OTHER PUBLICATIONS

European Search Report in related European Application No. 12186572.9, dated Nov. 27, 2012, 8 pages.
European Intention to Grant in related European Application No. 12186572.9, dated Oct. 17, 2013, 29 pages.

* cited by examiner

*Primary Examiner* — Rodney H Bonck
(74) *Attorney, Agent, or Firm* — Noah A. Tevis

(57) ABSTRACT

A hybrid overrunning clutch includes a metal outer race and a composite outer ring that are each sized and configured such that the metal race generates a preload on the composite outer race throughout the operational temperature of the clutch. The composite outer ring significantly reduces that total weight of the clutch, as compared to a completely metal outer race. The present application further includes a method of assembling the metal outer race and composite outer ring so that thermal expansion of the metal outer race creates the preload in the composite outer ring. The present application also includes a method of designing a hybrid overrunning clutch.

6 Claims, 5 Drawing Sheets

HYBRID OVERRUNNING CLUTCH ASSEMBLY AND METHOD OF MAKING SAME

GOVERNMENT LICENSE RIGHTS

This invention was made with government support under the U.S. Army Aviation Applied Technology Directorate (AATD) Program, Contract No. W911W6-10-2-0007, awarded by U.S. Army. The government has certain rights in the invention.

BACKGROUND

1. Technical Field

The present application relates to a hybrid overrunning clutch assembly, as well as a method of making the hybrid overrunning clutch assembly.

2. Description of Related Art

It is common for an aircraft, such as rotorcraft, to have an overrunning clutch so that torque from the engine can be transmitted to the rotor mast when rotating in one direction, but ceases to transmit torque when torque is applied in the reverse direction. Such a configuration allows the rotor system to continue to rotate even when an engine malfunctions and does not allow the rotor system to drive the engine.

Typically, sprag and roller ramp type clutches are commonly used as overrunning clutches in aircraft applications. Both sprag and roller ramp clutches are well known in the art. However, sprag and roller ramp type clutches generate relatively large radial forces on the outer race of the housing. Typically, a large amount of steel or other high strength material has been required to withstand the radial forces with limited deformation. The weight of the steel is especially undesirable in aircraft applications where weight negatively affects aircraft performance.

Hence, there is a need for an improved overrunning clutch assembly, as well as a method of making an improved overrunning clutch assembly.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatus are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The embodiments of the present application include a hybrid overrunning clutch, a method of making a hybrid overrunning clutch, and a method of designing a hybrid overrunning clutch.

Figure 1:
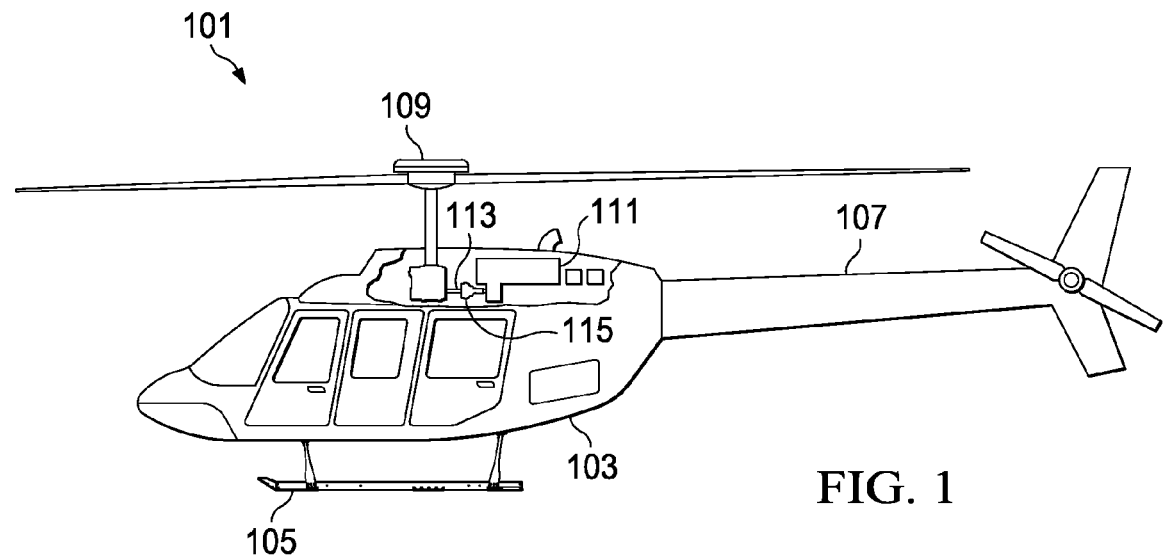
FIG. 1 is a side view of a rotorcraft having a hybrid overrunning clutch, according to an illustrative embodiment.

Referring to FIG. 1, a rotorcraft 101 is illustrated. Rotorcraft 101 includes a fuselage 103, a landing gear 105, a tail member 107, and a rotor system 109. An engine 111 provides torque to rotor system 109 via a driveshaft 113. An overrunning clutch 115 is operably associated with driveshaft 113 and engine 111. It should be appreciated that rotorcraft 101 is merely illustrative of a variety of aircraft that can implement hybrid overrunning clutch 115. Other aircraft implementations can include hybrid aircraft, tilt rotor aircraft, unmanned aircraft, gyrocopters, and a variety of helicopter configurations, to name a few examples. Further, the methods disclosed herein can be implemented to design and manufacture a hybrid overrunning clutch for a variety of aircraft implementations.

Figure 2:
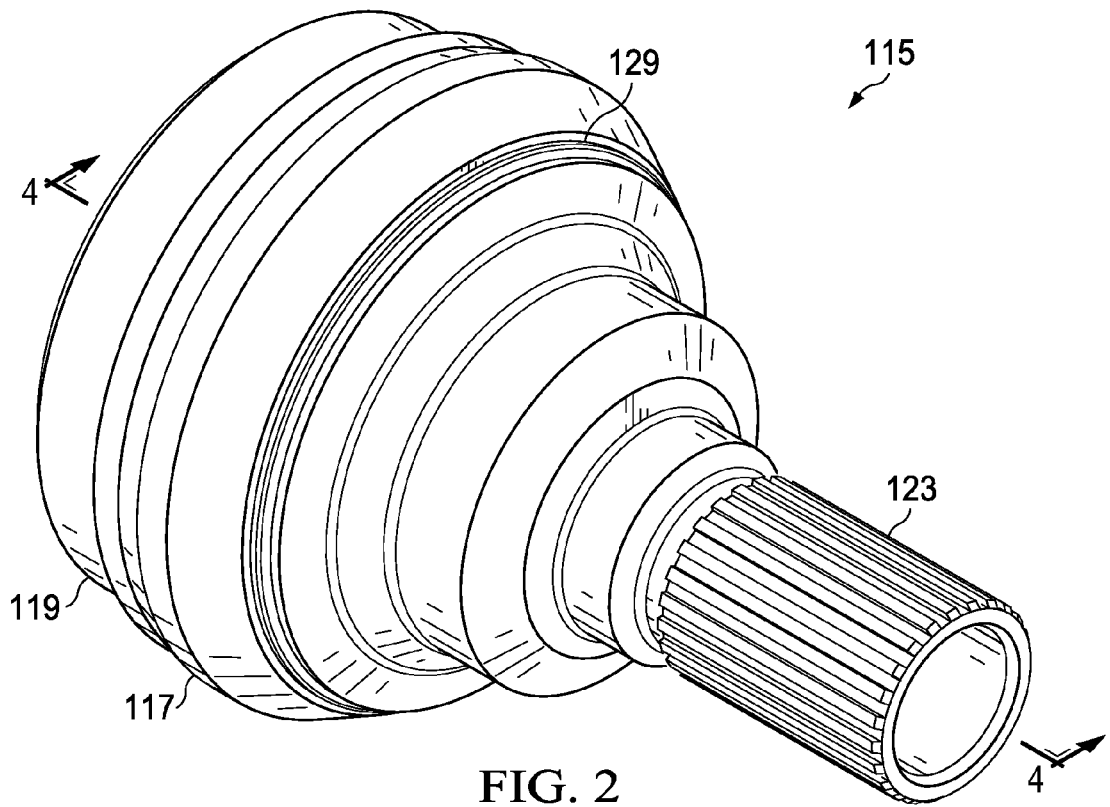
FIG. 2 is an isometric view of the hybrid overrunning clutch, according to an illustrative embodiment.
Figure 3:
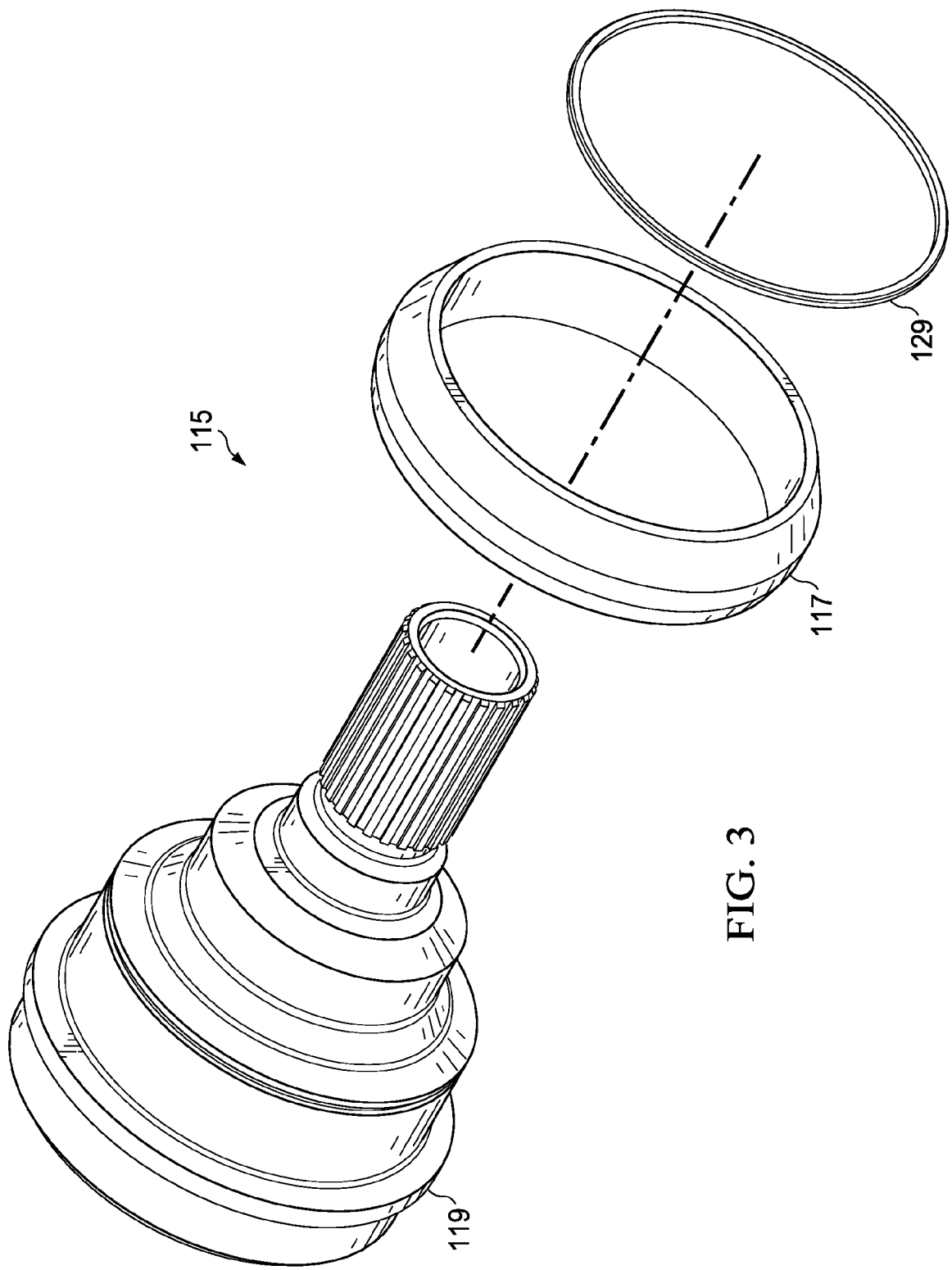
FIG. 3 is a partially exploded view of the hybrid overrunning clutch, according to an illustrative embodiment.
Figure 4:
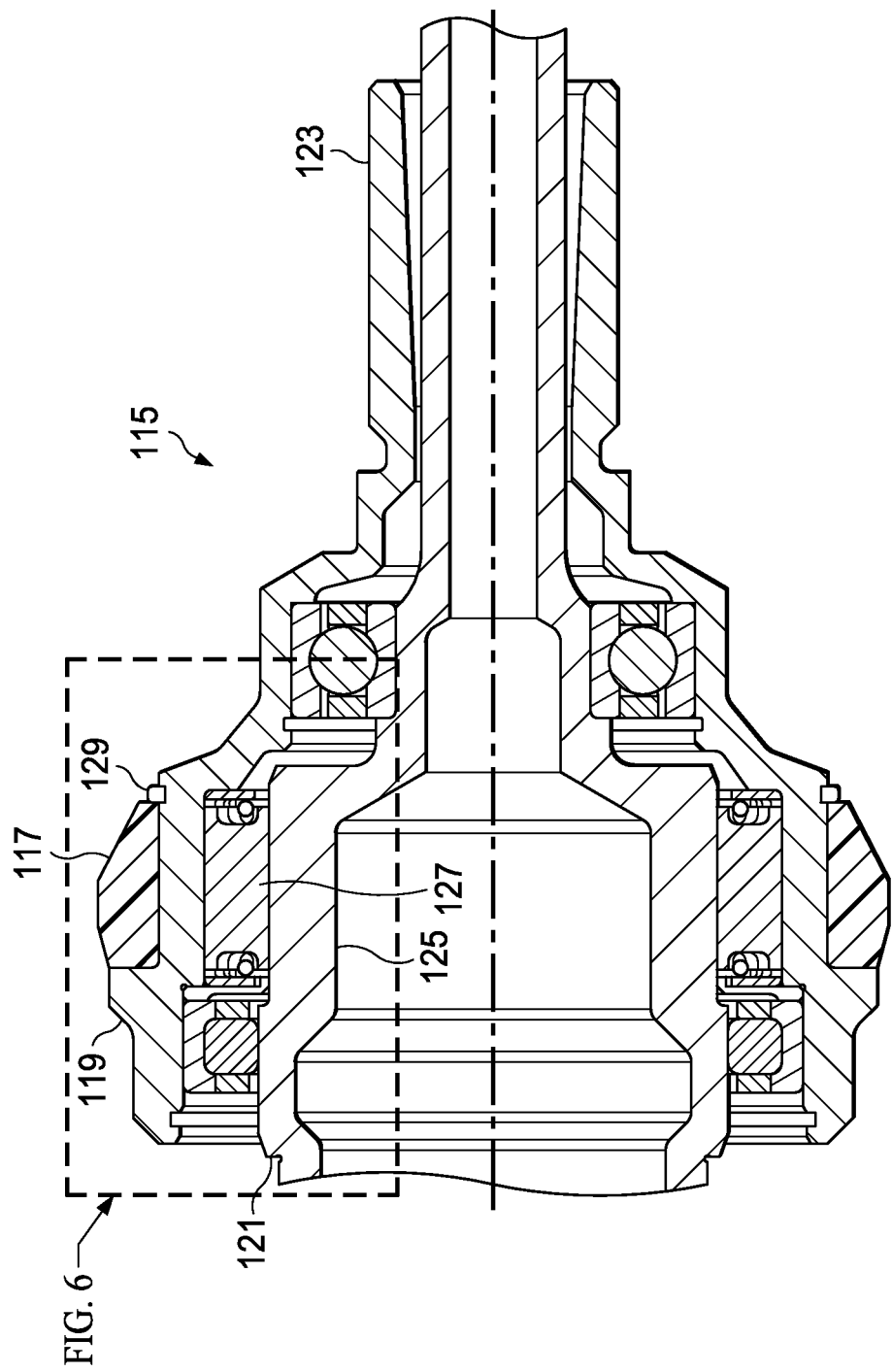
FIG. 4 is a cross-sectional view of the hybrid overrunning clutch, taken from section lines 4-4 in FIG. 2, according to the illustrative embodiment.

Referring to FIGS. 2-4, an example hybrid overrunning clutch 115 is illustrated. Clutch 115 includes a metal outer race 119 and a composite outer ring 117. An engine output provides torque to an input 123 of clutch 115. A clutch mechanism 127 unidirectionally allows torque to be transferred from input 123 to an output 121, the output 121 being configured for coupling to drive shaft 113. During operation, clutch mechanism 127 engages an inner race 125 so that torque is unidirectionally transferred from input 123 to output 121. Clutch mechanism 127 can be any mechanical system that is configured to unidirectionally transmit torque within an overrunning clutch. Clutch mechanism 127 can include sprag elements, roller ramp elements, or ratchet elements, to name a few illustrative examples of clutch mechanisms.

During operation, torque engagement produces an outward radial force against metal outer race 119 and a composite outer ring 117. Composite outer ring 117 is preferably a carbon/resin composite ring that is optimally sized for assembly with metal outer race 119. One exemplary composite system is M55J/RS-3C Cyanate resin system; however, it should be appreciated that composite outer ring 117 may be formed from other composite fiber/resin systems. Metal outer race 119 is preferably formed from a steel alloy, such as steel alloy AISI 9310; however, other metals alloys and compositions may be used. Composite outer ring 117 is configured to provide the tensile strength and stiffness to withstand and react the outward radial forces exhibited thereon by engagement of clutch mechanism 127. The composite outer ring 117 provides significant weight reduction over conventional clutch devices that rely solely upon a metal outer race to react all of the outward radial forces.

As discussed further in regard to method 501, composite outer ring 117 is preloaded in tension as a result of the unique assembly of metal outer race 119 and composite outer ring 117. Further, the material ratio between composite outer ring 117 and metal outer race 119 is specifically tuned to provide optimal stiffness and deformation during operation, so as to provide proper engagement of clutch mechanism 127 throughout the operation temperature range. In one illustrative embodiment, the operational temperature range is approximately −40° F. to 280° F. It should be appreciated that the temperature range is meant for illustrative purposes and not meant to be limiting. For example, in another embodiment, the operation temperature range can be −65° F. to 305° F. In the preferred embodiment, an adhesive is not required between metal outer race 119 and composite outer ring 117; however, an alternative embodiment can include adhesive layer for bonding metal outer race 119 and composite outer ring 117. In the preferred embodiment, thermal expansion of metal outer race 119 is relied upon to keep composite outer ring 117 in tension, even at the lower end of the operational temperature range.

A retaining ring 129 can be used to ensure retention of composite outer ring 117 at temperatures near the lower operation temperature range and below. In the illustrated embodiment, retaining ring 129 is formed with a shape memory alloy, such as a nickel/titanium alloy. As discussed further herein with regard to method 501, retaining ring 129 is configured so that an application of heat causes it to shrink and fit into a recessed groove in metal outer race 119.

Hybrid overrunning clutch 115 is uniquely configured so that composite outer ring 117 is easily replaceable if damaged. Replacing composite outer ring 117 can be accomplished by cutting and removing the damaged composite outer ring 117 and the retaining ring 129. Subsequently, a new composite outer ring 117 and retaining ring can be installed as outlined in step 307 and step 309, discussed further herein.

In an alternative embodiment of hybrid overrunning clutch 115, a ceramic ring, or other material having a high stiffness to weight ratio, is located within an inner portion of inner race 125 so as to replace a portion of steel in inner race 125. Such an embodiment can also include composite outer ring 117 located around metal outer race 119.

Figure 5:
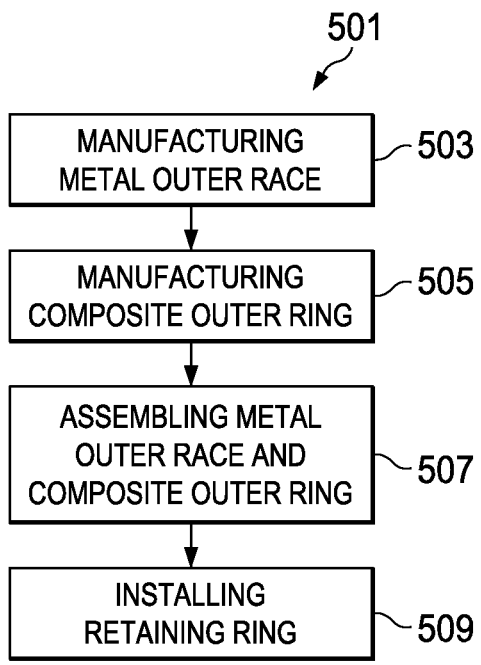
FIG. 5 is a schematic view of a method of manufacturing a hybrid overrunning clutch, according to the illustrative embodiment.

Referring now to FIG. 5, a method 501 of manufacturing hybrid overrunning clutch 115 is schematically illustrated. A step 503 includes manufacturing metal outer race 119 with a standard manufacturing process, such as machining or casting, for example. A step 505 includes manufacturing composite outer ring 117. Step 505 can include using any variety of composite manufacturing processes. For example, step 505 can include laying up pre-impregnated composite fiber strips onto a mandrel, the mandrel having an outside tooled surface that represents the desired diameter of the inner surface of composite outer ring 117. Preferably, step 505 includes completely curing composite outer ring 117 prior to assembling composite outer ring 117 with metal outer race 119 in a step 507. Furthermore, as discussed further in regard to step 507, the inner diameter of composite outer ring 117 is preferably smaller than the outer diameter of metal outer race 119, throughout the operational temperature range. This insures that metal outer race 119 generates a tension preload on composite outer ring 117 during operation of clutch 115.

Still referring to FIG. 5, step 507 includes assembling metal outer race 119 and composite outer ring 117. In the preferred embodiment, the metal outer race 119 is cold soaked at a temperature below the lowest operational temperature of clutch 115. For example, if the lowest operational temperature of clutch 115 is −40° F., then metal outer race 119 is preferably soaked below −40° F. In one embodiment, step 507 includes cold soaking metal outer race 119 at approximately −200° F. The cold soaking of metal outer race 119 creates sufficient thermal shrinkage so that composite outer ring 117 can be slipped over metal outer race 119. Step 507 further includes allowing the mated metal outer race 119 and composite outer ring 117 to gradually warm to an ambient temperature. As the mated metal outer race 119 and composite outer ring 117 warm, the metal outer race 119 expands at a greater rate than the composite outer ring. At an ambient temperature, metal outer race 119 exerts an outward radial force upon composite outer ring 117 so as to create a preload in composite outer ring 117. As further stated above, the outer diameter of metal outer race 119 and the inner diameter composite outer ring 117 are configured so that metal outer race 119 keeps composite outer ring 117 in a tension preload through the operating temperature range of clutch 115.

Still referring to FIG. 5, method 501 can include a step 509 of installing retaining ring 129 to ensure retention of composite outer ring 117 at temperatures near the lower operation temperature range and below. Retaining ring 129 is configured so that an application of heat causes it to shrink and fit into a recessed groove in metal outer race 119, thus step 509 includes locating retaining ring 129 approximate to the recessed groove and subjecting the retaining ring 129 to an elevated temperature so as to cause retaining ring 129 to shrink and tightly fit into the recessed groove.

Figure 7:
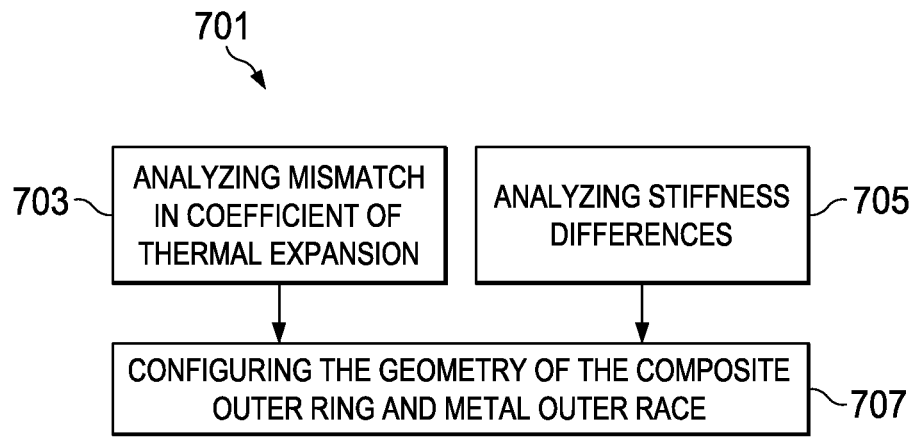
FIG. 7 is a schematic view of a method of designing a hybrid overrunning clutch, according to the illustrative embodiment.

Referring now also to FIG. 7, a method 701 of designing a hybrid overrunning clutch is schematically illustrated. Hybrid overrunning clutch 115 is required to be dependable and operate effectively in a broad temperature range. Because hybrid overrunning clutch 115 is an essential drive train component on an aircraft, a failure can be catastrophic. As such, it is essential that the clutch mechanism 127 effectively transmit torque throughout the broad temperature range. Therefore, method 701 enables a hybrid overrunning clutch 115 to be designed taking into account unique considerations of a hybrid overrunning clutch operational in an aircraft.

Method 701 can include a step 703 that involves analyzing the mismatch in the coefficients of thermal expansion of both composite outer ring 117 and metal outer race 119. Step 701 is important because metal outer race 119 has a much higher coefficient of thermal expansion than composite outer ring 117. This means that the outer race (composite outer ring 117 and metal outer race 119) and inner race 125 grow at different rates, so the sizes need to be designed so that the annular space between them is optimal at the temperature at which the hybrid overrunning clutch 115 normally operates so that clutch mechanism 127 operates most effectively at the normal operating temperature. Further, metal outer ring 119 needs to be configured without a substantially thicker area in one location that could cause "bell-mouthing" or a bending due to the thick portion of steel wanting to thermally expand more than the adjacent areas.

Method 701 also includes a step 705 for analyzing differences in stiffness of the composite outer ring 117 and metal outer race 119. Though the stiffness of composite outer ring 117 in the hoop direction is similar to the stiffness of the metal outer race 119, the stiffness of composite outer ring 117 is lower in the axial direction. This means that a flat composite outer ring 117 would tend to bend more in the middle when operationally loaded, as compared to the forward and aft portions of the composite outer ring 117. Such a bending deformation could negatively affect the torque transfer engagement of clutch mechanism 127.

Figure 6:
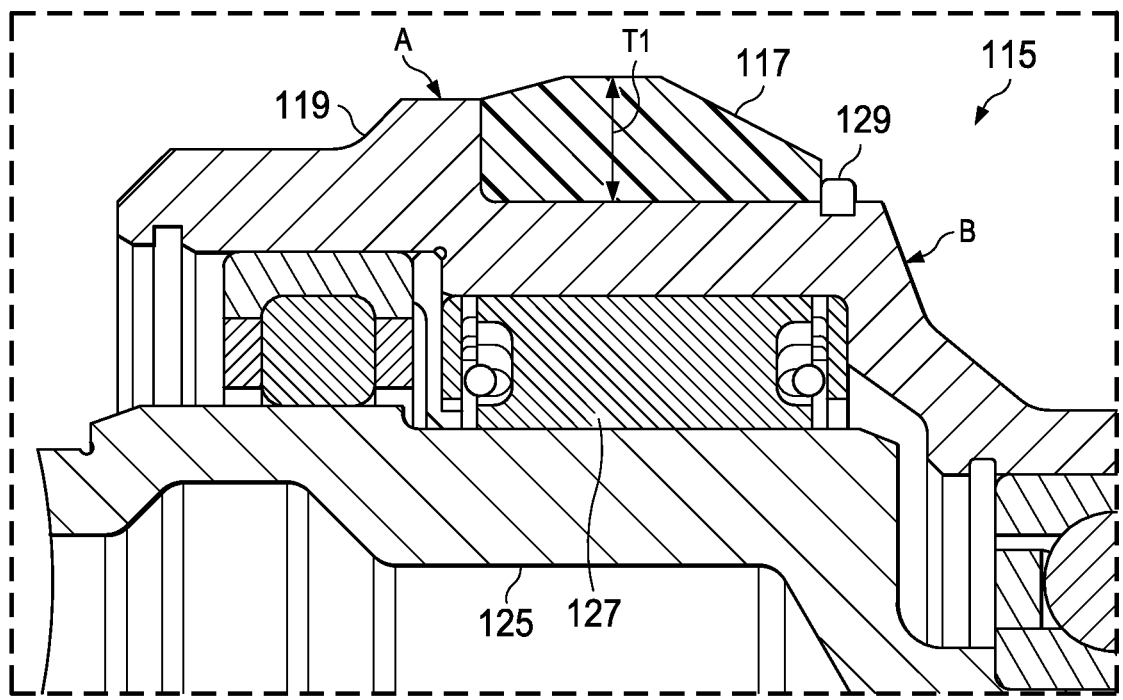
FIG. 6 is a detail view taken from the cross-sectional view in FIG. 4, according to the illustrative embodiment.

Method 701 also includes a step 707 for configuring the geometry of composite outer ring 117 and metal outer race 119. Referring now also to FIG. 6, step 707 can be described in regard to the geometry of composite outer ring 117 and metal outer race 119 of hybrid overrunning clutch 115. The geometry of metal outer race 119 is designed with consideration of the analysis in step 703 by having a steel portion A to balance a steel portion B, thereby preventing "bell-mouthing" that could otherwise occur with changing temperature if steel portion A were to be removed and replace by composite outer ring 117. Further, the geometry of composite outer ring 117 is designed with consideration of the analysis in step 705 by having a thicker portion T1 near the middle as compared to the end portions. The thicker portion T1 acts to compensate for the material stiffness differential between composite outer ring 117 and metal outer race 119 that could otherwise cause excessive bending in the middle of composite outer ring 117.

Figure 8:
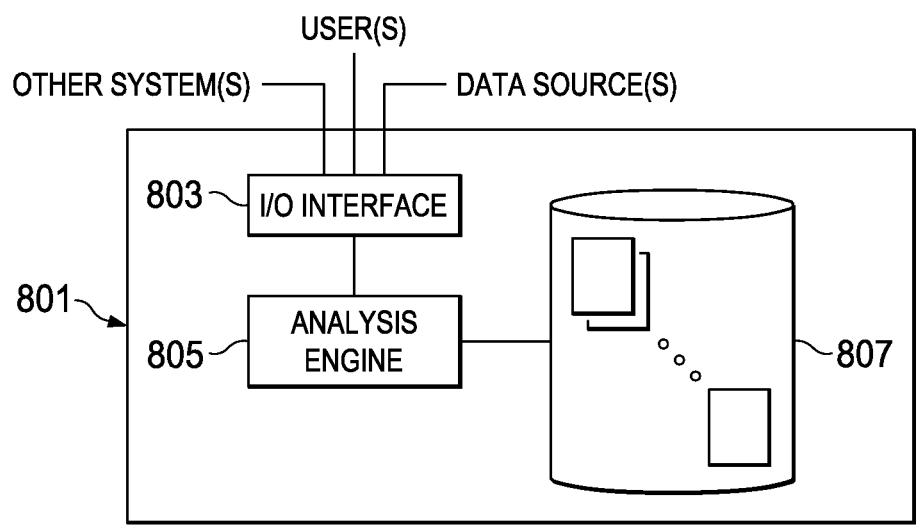
FIG. 8 is a schematic block diagram of a computer system, according to an illustrative embodiment of the present application.

Referring now to FIG. 8, a computer system 801 is schematically illustrated. System 801 is configured for performing one or more functions with regard to method 701, as well as other methods or processes described herein.

The system 801 can include an input/output (I/O) interface 803, an analysis engine 805, and a database 807. Alternative embodiments can combine or distribute the input/output (I/O) interface 803, analysis engine 805, and database 807, as desired. Embodiments of the system 801 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 803 can provide a communication link between external users, systems, and data sources and components of the system 801. The I/O interface 803 can be configured for allowing one or more users to input information to the system 801 via any known input device. Examples can include a keyboard, mouse, touch screen, and/or any other desired input device. The I/O interface 803 can be configured for allowing one or more users to receive information output from the system 801 via any known output device. Examples can include a display monitor, a printer, and/or any other desired output device. The I/O interface 803 can be configured for allowing other systems to communicate with the system 801. For example, the I/O interface 803 can allow one or more remote computer(s) to access information, input information, and/or remotely instruct the system 801 to perform one or more of the tasks described herein. The I/O interface 803 can be configured for allowing communication with one or more remote data sources. For example, the I/O interface 803 can allow one or more remote data source(s) to access information, input information, and/or remotely instruct the system 801 to perform one or more of the tasks described herein.

The database 807 provides persistent data storage for system 801. While the term "database" is primarily used, a memory or other suitable data storage arrangement may provide the functionality of the database 807. In alternative embodiments, the database 807 can be integral to or separate from the system 801 and can operate on one or more computers. The database 807 preferably provides non-volatile data storage for any information suitable to support the operation of the system 801, including various types of data discussed further herein.

The analysis engine 805 can be configured for analyzing the mismatch in the coefficients of thermal expansion of both composite outer ring 117 and metal outer race 119, analyzing differences in stiffness of the composite outer ring 117 and metal outer race 119, and configuring the geometry of composite outer ring 117 and metal outer race 119. The analysis engine 805 can include various combinations of one or more processors, memories, and software components.

The hybrid clutch of the present application provides significant advantages, including: 1) providing an outer race member having composite material to lighten the total weight of the clutch; 2) providing a method of manufacturing the hybrid clutch so that a outer metal race creates a preload on the composite outer ring throughout the operational temperature range of the clutch; 3) providing a composite outer ring and steel outer race assembly configured to provide adequate annular space for operation of the clutch mechanism within the operational temperature range; 4) providing an easily repairable composite outer ring and method of repair; and 5) providing a method of designing a hybrid overrunning clutch.

The particular embodiments disclosed above are illustrative only, as the apparatus may be modified and practiced in different but equivalent manners apparent to those skilled in the art having the benefit of the teachings herein. Modifications, additions, or omissions may be made to the apparatuses described herein without departing from the scope of the invention. The components of the apparatus may be integrated or separated. Moreover, the operations of the apparatus may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A hybrid overrunning clutch, the hybrid overrunning clutch comprising:
    an input member configured for receiving a torque from an engine;
    an output member configured for transmitting the torque;
    a clutch mechanism configured to unidirectionally transmit the torque between the input member and the output member;
    a metal outer race located adjacent to the clutch mechanism, the metal outer race having an outer surface; and
    a composite outer ring in contact with the outer surface of the metal outer race, the composite outer ring having an inner diameter;
    wherein the composite outer ring has a center thickness near a center portion of the composite outer ring, the center thickness being thicker than a forward thickness of a forward portion and an aft thickness at an aft portion; and
    wherein the inner diameter of the composite outer ring is constant from the forward portion to the aft portion.

2. The hybrid overrunning clutch according to claim 1, further comprising:
    a retaining ring configured to ensure retention of the composite outer ring on the metal outer race.

3. The hybrid overrunning clutch according to claim 2, wherein the retaining ring comprises a shape memory alloy.

4. The hybrid overrunning clutch according to claim 3, wherein the shape memory alloy is a nickel/titanium alloy.

5. The hybrid overrunning clutch according to claim 2, wherein the retaining ring is located in a recessed groove in the metal outer race.

6. The hybrid overrunning clutch according to claim 1, wherein the composite outer ring is configured to be in compression due at least in part from a thermal expansion of the metal outer race.

* * * * *